United States Patent [19]

Silberman

[11] 4,093,829
[45] June 6, 1978

[54] SINGLE LINE TELEPHONE HOLD CIRCUIT

[76] Inventor: Robert L. Silberman, 470 Groveland Ave., Highland Park, Ill. 60035

[21] Appl. No.: 777,067

[22] Filed: Mar. 14, 1977

[51] Int. Cl.$^2$ ............................................. H04M 1/00
[52] U.S. Cl. ..................................... 179/81 R; 179/99
[58] Field of Search .............................. 179/81 R, 99

[56] References Cited

U.S. PATENT DOCUMENTS

| 3,725,600 | 4/1973 | Hutton | 179/81 R |
| 3,742,151 | 6/1973 | Ruether | 179/99 |
| 3,870,831 | 3/1975 | McCarley | 179/81 R |
| 3,997,734 | 12/1976 | Champan | 179/81 R |
| 4,001,520 | 1/1977 | Waldman | 179/81 R |

Primary Examiner—Kathleen H. Claffy
Assistant Examiner—Joseph A. Popek
Attorney, Agent, or Firm—Allegretti, Newitt, Witcoff & McAndrews

[57] ABSTRACT

A solid-state circuit for maintaining line current in a two-wire telephone line placed on "HOLD" by the subscriber. A shunt impedance is connected in series with a pair of transistor switches, the first of which conducts only when the telephone line voltage is lower than a predetermined value and the second of which conducts whenever a momentary contact switch is manually actuated. The second transistor continues to conduct until a subsequent substantial decrease in telephone line voltage, indicative of a renewed off-hook condition, is detected.

2 Claims, 2 Drawing Figures

SINGLE LINE TELEPHONE HOLD CIRCUIT

BRIEF SUMMARY OF THE INVENTION

This invention relates to supervisory control circuits for telephone systems and more particularly, although in its broader aspects not exclusively, to an arrangement enabling a single-line telephone subscriber to hold active calls when his or her station set is placed in an on-hook condition.

Telephone hold circuits are widely used in key telephone systems. Manually-operated push-bottons on the face of a key telephone are used by the subcriber to establish a talking connection to a selected one of several lines to the central office (or to a PBX/PABX). The hold button on such a key telephone set is used to prevent an active call from being disconnected at the central office when the subscriber desires to be temporarily connected to a different line. In such key telephone systems, control circuits called "line cards" are employed to connect a shunt impedance across the active line which the subscriber wishes to place on HOLD. The shunt impedance maintains current in the held line even though the station set is disconnected and, in this way, simulates an active or off-hook condition to prevent the central office switching equipment from disconnecting the parties. An example of such a key-telephone line-card circuit is disclosed in U.S. Pat. No. 3,436,488, issued to R. E. Barbato and D. T. Davis.

Although the ability to hold calls is practically essential in a multiple-line key telephone system, it can provide significant advantages to a single-line subscriber as well. For example, a single-line subscriber may wish to prevent a caller from overhearing a private conversation (a palm clasped over the telephone's mouthpiece may be insufficient). A subscriber with one or more extension telepones may wish to place the line in a hold condition so that one telephone can be hung-up and the conversation resumed later on a different extension telephone.

The present invention is an improved telephone hold circuit particularly adapted for use in connection with telephone station sets which are connected to the central office by a single line. The circuit is completely compatible with standard telephone systems, is easily connected to the tip and ring conductors of the line (the only connection required), consumes very little operating current, contains no relays, and may be inexpensivelyconstructed using a standard integrated circuit as its principle component.

In accordance with the invention, semiconductor switching means are employed to connect a shunt impedance across the two-wire telephone line in response to the actuation of a manually-operated switch and control means are employed to disconnect the shunt impedance whenever the voltage across the line thereafter exhibits a substantial decrease.

According to a further feature of the invention, the transistor switching means includes a first semiconductor switch which is held in a non-conductive state whenever the line voltage exceeds a predetermined value, thereby preventing the line from entering the hold state if the manually-operated switch is actuated when the connected station sets are on-hook, eliminating unnecessary operating current drain during idle line conditions, and protecting the remaining control circuitry against excessive line voltages.

According to a further feature of the invention, sensing means are employed to disconnect the shunt impedance whenever any telephone set connected to the line goes off-hook, the sensing means including a resistive/capacitive time delay network and a comparator for disconnecting the shunt impedance whenever the voltage across a held line exhibits a substantial decrease.

BRIEF DESCRIPTION OF THE DRAWING

These and other features and advantages of the present invention will become more apparent through a consideration of the following detailed description. In the course of this description reference will be made to the attached drawing in which.

DESCRIPTION OF THE PREFERRED EMBODIMENT

Figure 1:
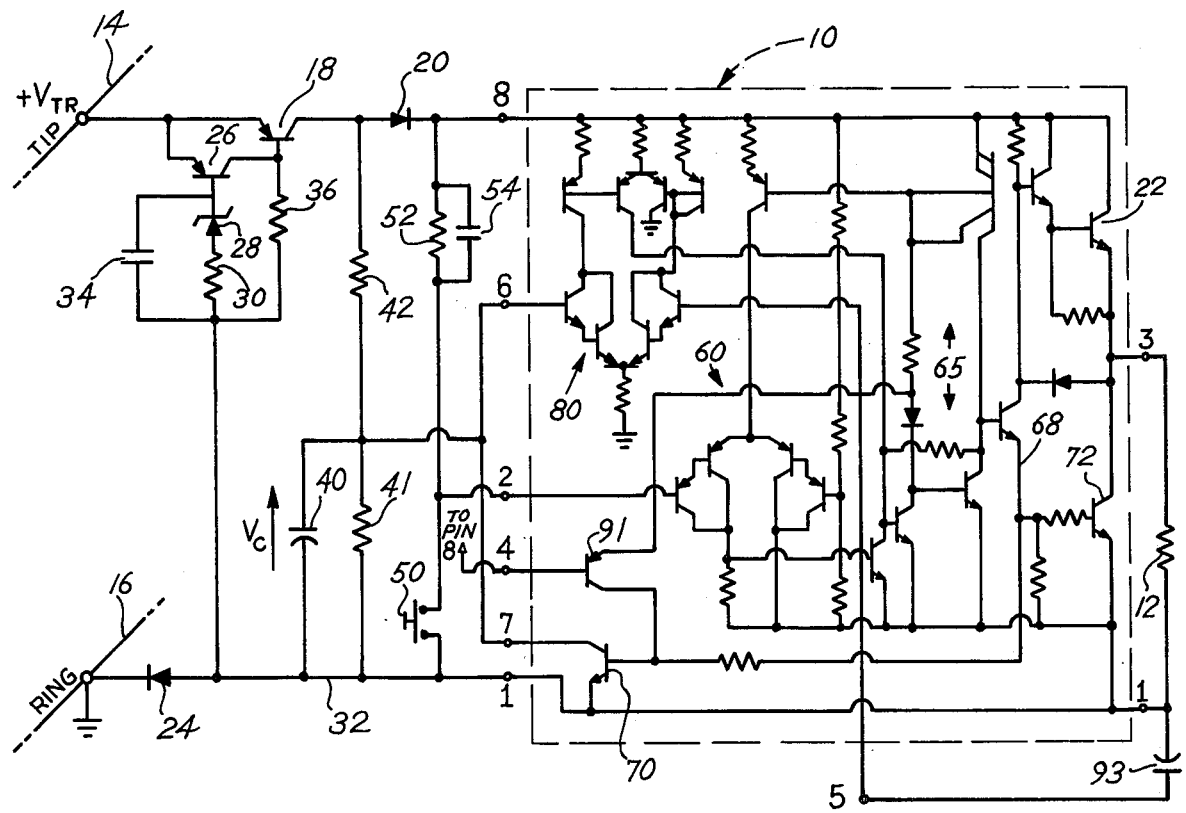
FIG. 1 is a schematic diagram of a single line telephone hold circuit embodying the principles of the invention.

The single-line telephone hold circuit shown in FIG. 1 employs a standard integrated circuit (which is shown in FIG. 1 within the rectangular dotted line). External circuitry is connected to the integrated circuit by means of pin connections numbered 1 through 8 in FIG. 1. This integrated circuit, indicated generally at 10, is a monolithic timing circuit normally used as a monostable (one-shot) time period generator or as an astable oscillator. As will be seen, integrated circuit 10 is used in a quite different way in the embodiment of the invention as shown in FIG. 1.

The circuit of FIG. 1 is employed to selectively connect a shunt impedance 12 between the tip and ring conductors 14 and 16 respectively of a two-wire telephone transmission line. A transistor 18, employed as a semiconductor switch, is serially connected with a diode 20 between the tip conductor 14 and pin 8. Within the integrated circuit 10, a transistor switch 22 connects pin 8 to pin 3. The external shunt impedance 12 is connected between pin 3 and pin 1, pin 1 being connected by a diode 24 to the ring conductor 16 which may be assumed to be at ground potential.

Thus, because the tip conductor 14 is normally positive with respect to the ring conductor 16, diodes 20 and 24 are forward biased. In effect, therefore, the external transistor 18 and transistor 22 within integrated circuit 10 connect the impedance 12 across the tip and ring connectors 14 and 16 when and only when both are conductive.

The transistor 18 is employed (1) to eliminate unnecessary operating current drain during idle line conditions; (2) to prevent the line from entering the hold state if the manually-operated hold button is inadvertently depressed when the connected station sets are on-hook; and (3) to protect the integrated circuit 10 against excessive line voltages. The emitter-collector path of a transistor 26 is connected between the tip conductor 14 and the base of transistor 18. A Zener diode 28 is serially connected with a current-limiting resistor 30 between the base of transistor 26 and conductor 32. The normally forward biased diode 24 protects the circuitry from reverse polarity voltages. A capacitor 34 is connected between the base of transistor 26 and conductor 32. Resistor 36 connects the base of transistor 18 to conductor 32.

During idle conditions when all station sets connected to the tip and ring conductors 14 and 16 are "on-hook", a potential of approximately +48 volts is present on the tip conductor 14. The base of transistor 26 is held at the breakdown voltage of the Zener diode 28 so that, whenever the tip conductor voltage exceeds the breakdown voltage of diode 28, transistor 26 conducts to block transistor 18. Resistor 36 has a very high impedance to limit operating current drain during this idle state.

When a telephone set connected to the tip and ring conductor goes "off-hook", the potential present on tip conductors 14 drops from its normal +48 volt level to approximately +10 volts; that is, to a potential less than the breakdown voltage of diode 28. As a result, transistor 26 is turned off and transistor 18 is turned on to supply an operating potential of approximately +10 volts to the remaining circuitry.

A high impedance time delay network, made up of the parallel combination of a timing capacitor 40 and the resistor 41, connected in series with charging resistor 42, is connected between the collector of transistor 18 and the grounded conductor 32. When transistor 18 is conductive, the capacitor 40 may be charged to a potential approximately ½ that present across tip and ring conductors 14 and 16, resistors 41 and 42 having approximately equal impedances. The junction of resistors 41 and 42 is connected to both pins 6 and 7 of the integrated circuit 10.

The telephone line is placed in a held state by manual actuation of the normally open, momentary-contact hold button 50 which, when closed, connects pin 2 of the integrated circuit 10 to conductor 32. When switch 50 is open, pin 2 is held at a high potential by resistor 52 and capacitor 54. When switch 50 is closed, the potential at pin 2 is reduced to near ground potential, triggering a comparator circuit indicated generally at 60 within the integrated circuit 10. The comparator 60 is triggered whenever the potential applied to pin 2 falls below one-third the voltage level applied to pin 8. The comparator 60 in turn triggers the flip-flop indicated generally at 65 within the integrated circuit 10. At this time, the potential on conductor 68 is reduced, turning off a transistor 70 whose base-emitter path is connected between pins 1 and 7. The previously conductive transistor 70 held capacitor 40 in a discharged state. However, as soon as transistor 70 is turned off, capacitor 40 begins to charge by virtue of the current flowing through resistor 42 to a level approximately one-half that of the voltage applied to pin 8.

At the same time, the previously conductive transistor 72 is turned off and transistor 22 is turned on, effectively connecting the shunt impedance 12 across the tip and ring lines 14 and 16.

As the timing capacitor 40 charges, the voltage applied to pin 6 increases. However, the threshold comparator indicated generally at 80 within the integrated circuit 10 will not be triggered to reset the flip-flop 65 until voltage at pin 6 reaches two-thirds of the voltage at pin 8. This will not occur at this time, as previously noted, because the voltage divider formed by resistors 41 and 42 limits the charge on capacitor 40 to approximately one-half of the potential at pin 8.

Figure 2:
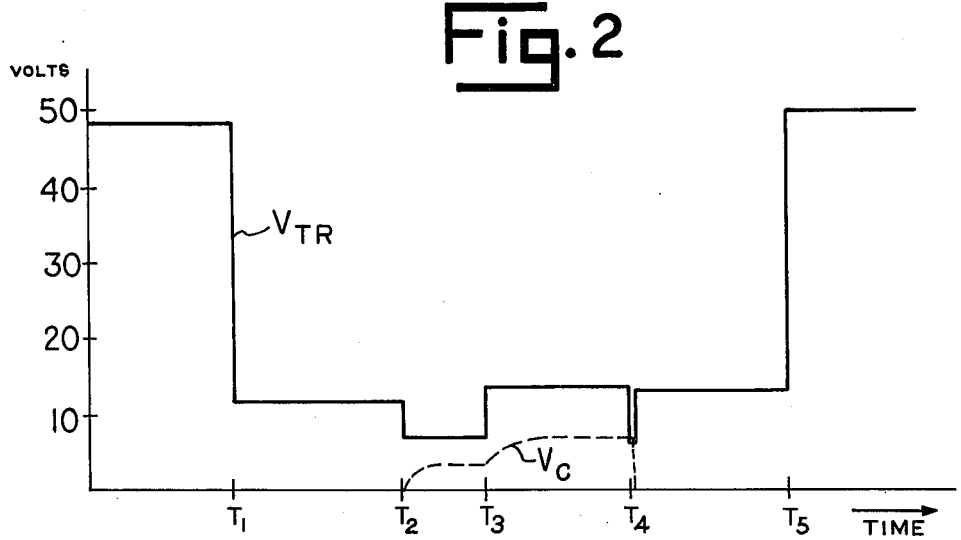
FIG. 2 is a graph of two voltage waveforms illustrating the operation of the circuit shown in FIG. 1.

As seen in the graph of FIG. 2, the tip to ring voltage $V_{TR}$ drops from approximately +48 volts to approximately +10 volts when a station set goes off-hook as indicated at time $T_1$. When the hold button 50 is depressed at time $T_2$, the tip to ring voltage decreases again to approximately +6 volts because of the connection of the shunt impedance 12 across the line. Beginning at time $T_2$, the capacitor 40 begins to charge toward one-half the tip to ring potential as indicated in FIG. 2 by the waveform $V_c$. When the station set is then placed on-hook at time $T_3$ the line potential returns to approximately +10 volts and the timing capacitor 40 continues to be charged toward one-half the now increased line voltage.

When the station set (or a different "extension" set) goes off-hook, the line voltage again decreases abruptly as illustrated at time $T_4$ in FIG. 2. This time, however, the voltage retained on capacitor 40 is greater than two-thirds the voltage at pin 8 and the threshold comparator 80 is triggered, resetting the flip-flop 65, turning transistor 22 off to remove the connection of shunt resistor 12 from across the tip and ring conductors 14 and 16. Transistors 70 and 72 are turned on and the conductive transistor 70 quickly discharges the capacitor 40.

Pins 4 and 5 of the integrated circuit 10 perform no control function. Pin 4 is connected directly to pin 8 to hold the reset transistor 91 off. Pin 5 is connected to pin 1 by a capacitor 93 which prevents noise signals from effecting the operation of the circuit.

The integrated circuit 10 depicted by way of illustration in FIG. 1 (or its equivalents) is available from several manufacturers and is generally called a Type 555 Monolithic Timing Circuit. More specifically, the circuit shown in FIG. 1 is available from Motorola Inc. under the device type number MC1555/MC1455. It is, of course, to be understood that numerous other arrangements could be devised to instrument applicant's invention. Indeed, numerous modifications may be made to the specific embodiment disclosed without departing from the true spirit and scope of the invention.

What is claimed is:

1. In combination with a two-wire telephone line connecting at least one telephone station set to a central exchange, an auxiliary hold circuit for maintaining line-current when said station set is placed in an on-hook state to prevent undesired disconnection of an active call at said central exchange, said hold circuit comprising, in combination, first and second semiconductor switching devices serially connected with a shunt impedance across said two-wire line;

means for rendering said first semiconductor switching device conductive whenever the voltage across said two-wire line is less than a predetermined value;

manually-operated switching means for rendering said second semiconductor switching device conductive to connect said shunt impedance across said line; and a control circuit for rendering said second device nonconductive whenever the voltage across said line exhibits a substantial decrease while said shunt impedance is connected across said line.

2. Apparatus as set forth in claim 1 including a capacitive time-delay network and a comparator connected to render said second switch nonconductive whenever the voltage across said two-wire line exhibits a substantial decrease.

* * * * *